(12) United States Patent
Zhang et al.

(10) Patent No.: US 10,171,844 B2
(45) Date of Patent: Jan. 1, 2019

(54) METHOD AND SYSTEM OF ADVERTISING

(71) Applicant: HARBIN INSTITUTE OF TECHNOLOGY SHENZHEN GRADUATE SCHOOL, Shenzhen (CN)

(72) Inventors: Haijun Zhang, Shenzhen (CN); Xiong Cao, Shenzhen (CN); Xiaohui Huang, Shenzhen (CN)

(73) Assignees: HARBIN INSTITUTE OF TECHNOLOGY, SHENZHEN, Shenzhen (CN); Haijun Zhang, Shenzhen (CN)

( * ) Notice: Subject to any disclaimer, the term of this patent is extended or adjusted under 35 U.S.C. 154(b) by 0 days.

(21) Appl. No.: 15/716,487

(22) Filed: Sep. 26, 2017

(65) Prior Publication Data

US 2018/0020247 A1   Jan. 18, 2018

Related U.S. Application Data

(63) Continuation-in-part of application No. PCT/CN2015/096033, filed on Nov. 30, 2015.

(30) Foreign Application Priority Data

Mar. 27, 2015 (CN) .......................... 2015 1 0142208

(51) Int. Cl.
*H04N 21/231* (2011.01)
*H04N 21/234* (2011.01)
(Continued)

(52) U.S. Cl.
CPC ... *H04N 21/23424* (2013.01); *G06K 9/00362* (2013.01); *G06K 9/00718* (2013.01);
(Continued)

(58) Field of Classification Search
None
See application file for complete search history.

(56) References Cited

U.S. PATENT DOCUMENTS

| 8,935,393 B1 * | 1/2015 | Jackson | G06Q 30/0631 709/224 |
| 8,954,346 B1 * | 2/2015 | Walker | H04N 21/435 386/249 |

(Continued)

*Primary Examiner* — Ricky Chin
(74) *Attorney, Agent, or Firm* — Matthias Scholl P.C.; Matthias Scholl

(57) ABSTRACT

A method of advertising, the method including: 1) segmenting a source video into individual scenes using a clustering-based approach; 2) obtaining relevant information about objects in the video for each individual scene using region-wise convolutional characteristics based detection; 3) searching, in a database, for advertisement objects matching the objects using garment retrieval and a category-based strategy; 4) performing optimization processing of retrieved advertisement objects matching the objects to obtain a candidate advertisement; and 5) optimizing a distance between an advertisement and a target object and an area of overlapping regions between the advertisement and all objects; and 6) distributing the video that contains the candidate advertisement to a plurality of displays and displaying the video that contains the candidate advertisement on the plurality of displays.

8 Claims, 2 Drawing Sheets

(51) Int. Cl.
- *H04N 21/23* (2011.01)
- *H04N 21/266* (2011.01)
- *H04N 21/278* (2011.01)
- *G06Q 30/02* (2012.01)
- *G06K 9/00* (2006.01)
- *G06N 3/02* (2006.01)
- *H04N 21/81* (2011.01)
- *G06K 9/32* (2006.01)
- *G06K 9/46* (2006.01)
- *G06K 9/62* (2006.01)
- *H04N 21/2343* (2011.01)
- *H04N 21/25* (2011.01)
- *H04N 21/845* (2011.01)

(52) U.S. Cl.
CPC ..... *G06K 9/00744* (2013.01); *G06K 9/00765* (2013.01); *G06K 9/3233* (2013.01); *G06K 9/4628* (2013.01); *G06K 9/627* (2013.01); *G06K 9/6218* (2013.01); *G06N 3/02* (2013.01); *G06Q 30/02* (2013.01); *H04N 21/231* (2013.01); *H04N 21/23109* (2013.01); *H04N 21/23418* (2013.01); *H04N 21/234318* (2013.01); *H04N 21/251* (2013.01); *H04N 21/812* (2013.01); *H04N 21/8456* (2013.01)

(56) References Cited

U.S. PATENT DOCUMENTS

| | | | | |
|---|---|---|---|---|
| 9,584,874 | B1* | 2/2017 | Farias | H04N 21/25883 |
| 2009/0063250 | A1* | 3/2009 | Burgess | G06Q 30/02 705/14.52 |
| 2009/0063268 | A1* | 3/2009 | Burgess | G06Q 30/02 705/14.39 |
| 2009/0106100 | A1* | 4/2009 | Mashinsky | G06Q 10/0637 705/14.1 |
| 2009/0171787 | A1* | 7/2009 | Mei | G06Q 30/02 705/14.69 |
| 2009/0216622 | A1* | 8/2009 | Hoashi | G06F 17/30743 705/14.54 |
| 2012/0102033 | A1* | 4/2012 | Sarshar | G06F 17/30784 707/737 |
| 2013/0024286 | A1* | 1/2013 | Envarli | G06Q 30/02 705/14.61 |
| 2013/0080434 | A1* | 3/2013 | Subasic | G06F 17/3071 707/737 |
| 2013/0080439 | A1* | 3/2013 | Subasic | G06F 17/30864 707/741 |
| 2013/0129149 | A1* | 5/2013 | Nandakumar | G06Q 30/0276 382/104 |
| 2013/0298159 | A1* | 11/2013 | You | H04N 21/478 725/34 |
| 2013/0344468 | A1* | 12/2013 | Lindsay | G06Q 30/0201 434/322 |
| 2014/0075004 | A1* | 3/2014 | Van Dusen | H04L 41/04 709/223 |
| 2014/0214790 | A1* | 7/2014 | Vaish | G06F 17/30011 707/709 |
| 2015/0032738 | A1* | 1/2015 | Nachnani | G06F 17/30554 707/723 |
| 2018/0165554 | A1* | 6/2018 | Zhang | G06N 3/04 |
| 2018/0204111 | A1* | 7/2018 | Zadeh | G06N 3/0454 |
| 2018/0225709 | A1* | 8/2018 | Ferber | G06F 17/30867 |

* cited by examiner

METHOD AND SYSTEM OF ADVERTISING

CROSS-REFERENCE TO RELATED APPLICATIONS

This application is a continuation-in-part of International Patent Application No. PCT/CN2015/096033 with an international filing date of Nov. 30, 2015, designating the United States, now pending, and further claims foreign priority to Chinese Patent Application No. 201510142208.1 filed Mar. 27, 2015. The contents of all of the aforementioned applications, including any intervening amendments thereto, are incorporated herein by reference. Inquiries from the public to applicants or assignees concerning this document or the related applications should be directed to: Matthias Scholl P.C., Attn.: Dr. Matthias Scholl Esq., 245 First Street, 18th Floor, Cambridge, Mass. 02142.

BACKGROUND OF THE INVENTION

Field of the Invention

The present disclosure relates to the field of video content awareness, and more particularly to a method and system of advertising based on Internet-video content awareness.

Description of the Related Art

With the advent of personal computers and handheld mobile devices, network video has become one of the most commonly used network services. For online-video websites, most profits come from advertisement. Commonly, advertisements are shown at the beginning or end of a video, regardless of the relevance of the video content to the advertisement. In this way, a user is forced to watch every advertisement. As a result, a user who is not interested in a particular advertisement may feel annoyed. Hence, the advertisement may lose its effect and cause a negative impact on user experience. Therefore, there is an urgent need for an effective online-advertisement recommendation system, which can take into account the content of an advertisement with respect to the relevance of the video content being played so as to improve the user's viewing experience.

SUMMARY OF THE INVENTION

In view of the above-described problems, it is one objective of the invention to provide a method and system of advertising based on video content awareness.

To achieve the above objective, in accordance with one embodiment of the invention, there is provided a method of advertising based on video content awareness, the method comprising:

A) segmenting a source video into individual scenes, using a clustering-based approach;
B) obtaining relevant information about objects in the source video for each individual scene, using region-wise convolutional characteristics based detection;
C) searching, in a database, for advertisement objects matching the objects, using garment retrieval and a category-based strategy;
D) performing optimization processing of the retrieved advertisement objects matching the objects, to obtain a candidate advertisement;
E) adding the candidate advertisement into the source video, optimizing a distance between an advertisement and a target object and an area of overlapping regions between the advertisement and all the objects; and
F) distributing the video that comprises the candidate advertisement to a plurality of displays and displaying the video that comprises the candidate advertisement on the plurality of displays.

In a class of this embodiment, A) comprises the following steps:
A1. calculating the number N of categories for clustering, according to a duration of a video;
A2. randomly selecting N frames as initial centers, according to the duration;
A3. calculating a distance from each frame to its time-proximal center and updating the center, respectively; and
A4. repeating A3 until convergence or reaching a maximum running number.

In a class of this embodiment, B) comprises the following steps:
B1. employing selective search, to generate category-independent candidate regions in an individual scene;
B2. utilizing a convolutional neural network (CNN), to extract a 4096-dimensional characteristic vector for each candidate region and output it in a penultimate layer; and
B3. classifying the objects of the extracted 4096-dimensional characteristic vector.

In a class of this embodiment, C) comprises the following steps:
C1. recognizing human genders in the video, on the basis of the CNN;
C2. extracting human body characteristics in the video; and
C3. matching the extracted human body characteristics.

In a class of this embodiment, the insertion of the advertisement in the video employs seamless insertion.

Another objective of the present disclosure is to provide a system of advertising, and the system comprises:
a camera, adapted for recording a source video;
a memory unit, adapted for storing the source video;
a shot segmentation module, comprising a first central processing unit (CPU); the first CPU being adapted to calculate and segment the source video into individual scenes based on clustering-based approach, and the individual scenes being stored in the memory unit;
an object detection module, comprising a second CPU and a first graphics processing unit (GPU); the first GPU being adapted to calculate and obtain relevant information about objects in the source video for each individual scene using region-wise convolutional characteristics based detection, and store the relevant information about objects in the memory unit;
an advertisement-image retrieval module, comprising a third CPU and a second GPU for searching, in a database, for advertisement objects matching the objects, using garment retrieval and a category-based strategy;
an advertisement-target-object optimization module, comprising a fourth CPU for performing optimization processing of the retrieved advertisement objects matching the objects, to obtain a candidate advertisement;
an advertisement-insertion-position optimization module, comprising a fifth CPU for optimizing the distance between an advertisement and a target object, as well as the area of the overlapping regions between the advertisement and all the objects.

In a class of this embodiment, the system is connected to a plurality of displays.

In a class of this embodiment, the shot segmentation module further comprises:

a category-number statistic unit, for calculating the number N of categories for clustering by using the first CPU according to a duration of a video and transmitting the number N from the first CPU to the memory unit;

a center-initialization unit, for randomly selecting N frames as initial centers by using the first CPU according to the duration and transmitting the position data of the initial centers from the first CPU to the memory unit;

a distance-calculation unit, for calculating a distance from each frame to its time-proximal center and updating the center, by using the first CPU and transmitting the updated centers from the first CPU to the memory unit; and an iterative calculation unit, for repeating calculating a distance from each frame to its time-proximal center, updating the center using the first CPU to obtain an updated center, and transmitting the updated center from the first CPU to the memory unit by using the first CPU and the memory unit until convergence or reaching a maximum running number.

In a class of this embodiment, the object detection module further comprises:

a region-generation unit, for employing selective search, to generate category-independent candidate regions in an individual scene by using the second CPU and transmitting the candidate regions from the second CPU to the memory unit;

an extraction unit, for utilizing a CNN, to extract a 4096-dimensional characteristic vector for each candidate region by using the first GPU and output it in a penultimate layer to the second CPU; and a classification unit, for classifying the objects of the extracted 4096-dimensional characteristic vector by using the second CPU and transmitting the classified vector to the memory unit.

In a class of this embodiment, the advertisement-image retrieval module further comprises:

a gender-recognition unit, for recognizing human genders in the video, on the basis of the CNN by using the second GPU to extract human characteristics and by using the third CPU to recognize the human genders, and transmitting data about the human genders in the video to the memory unit;

a characteristics-extraction unit, for extracting human body characteristics in the video by using the third CPU; and a characteristics-matching unit, for matching the extracted human body characteristics by using the second GPU and transmitting the matching result to the memory unit by using the third CPU.

In a class of this embodiment, the insertion of the advertisement in the video employs seamless insertion, and the advertisement-inserted video is stored in the memory unit.

Advantages of a method and system of advertising based on Internet-video content awareness of the present disclosure are summarized as follows. The present disclosure develops a video advertisement recommendation system, which takes into account content relevance and disturbance of advertisement insertion. For a given video, the system can automatically detect an object which appears in the video, select an advertisement relevant to the object, and insert the selected advertisement in the position where the relevant object appears. Especially, for a garment advertisement, the present disclosure designs a deep-CNN based method for recognizing human genders and extracting characteristics for garment retrieval. Finally, for an object level video advertising (OLVA) system, the present disclosure proposes a global optimization model which takes into account four aspects of video advertising: content relevance, appeal to users, time dispersion in advertisement display, and diversity in advertisement categories. Specifically, the main contribution of the present disclosure lies in three points as follows.

1. An OLVA online-video advertising framework is proposed. Under this framework, an advertisement publisher can automatically detect objects in video, insert advertisements relevant to the video content, without the need of using any other information, such as textual information describing the video. 2. In order to improve user experience, an optimization model is proposed, which aims at increasing appeal of advertisements, to reduce disturbance to users. The present disclosure proposes a heuristic algorithm (HA), to solve the optimization problem. The present disclosure further employs a genetic algorithm (GA), to use an appropriate gene coding to solve the global optimization problem. In further study, the present disclosure compares the experimental results of the two algorithms. The study shows that the genetic algorithm can obtain better global optimal solution, but requires longer calculation time, compared with the heuristic algorithm. In contrast, the heuristic algorithm requires shorter calculation time, while producing a satisfactory solution to the video-advertising optimization problem. 3. Under the proposed framework, a video-advertisement display strategy is discussed. In regard to display of video advertisement, the present disclosure proposes an advertisement-display-position optimization model, which aims at minimizing the distance between the selected advertisement and the target object, as well as the area of the overlapping regions between the advertisement and the objects appearing in the video. The present disclosure employs a gradient-descent approach to obtain the optimum position, then displays the advertisement at the optimum position on a screen.

DETAILED DESCRIPTION OF THE PREFERRED EMBODIMENTS

Figure 1:
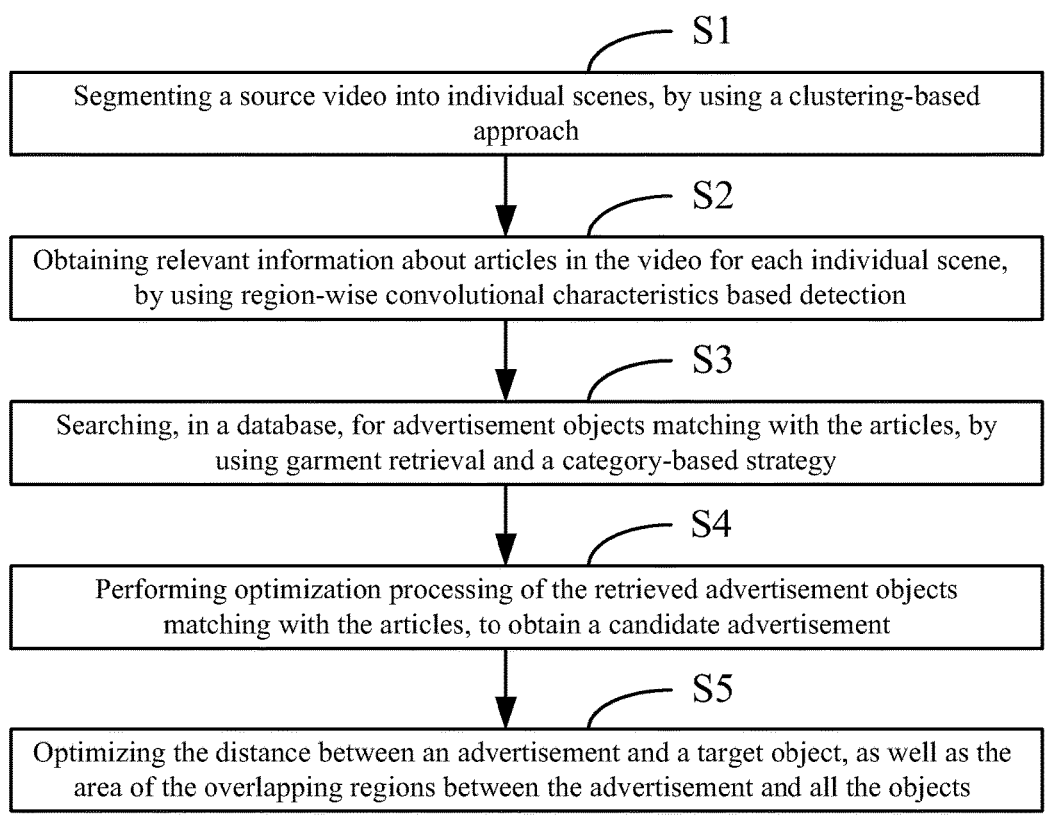
FIG. 1 is a flowchart of a method of advertising based on video content awareness according to an embodiment of the present disclosure.

FIG. 1 shows a flowchart of a method of advertising based on video content awareness provided by the present disclosure, and the method is described in detail as follows.

Step S1: a shot segmentation step, for segmenting a source video into individual scenes, using a clustering-based approach; extracting HOG characteristic values, segmenting a shot by a clustering approach, then performing unsupervised learning through extraction of characteristic values of each image, to obtain segmented scenes; the specific implementation process is as follows: by extracting characteristic values of each image, and then performing unsupervised learning, segmented scenes are thus obtained. Scene-clustering is different from other clustering approaches, because it is required to takes into account the time at which a frame appears, and only frames that appear at proximal time can be clustered together. Specifically, shot segmentation comprises the following steps: (1) recording a source video by a camera and storing the source video in a memory unit, calculating the number N of categories for clustering using the first CPU, according to a duration of a video, and transmitting the number N from the first CPU to the memory unit; (2) randomly selecting N frames as initial centers using the first CPU, according to the duration, and transmitting the position data of the initial centers from the first CPU to the memory unit; (3) calculating a distance from each frame to its time-proximal center and updating the center, using the first CPU, and transmitting the updated centers from the first CPU to the memory unit. (4) repeating (3) using the first CPU until convergence or reaching a maximum running number.

Figure 2:
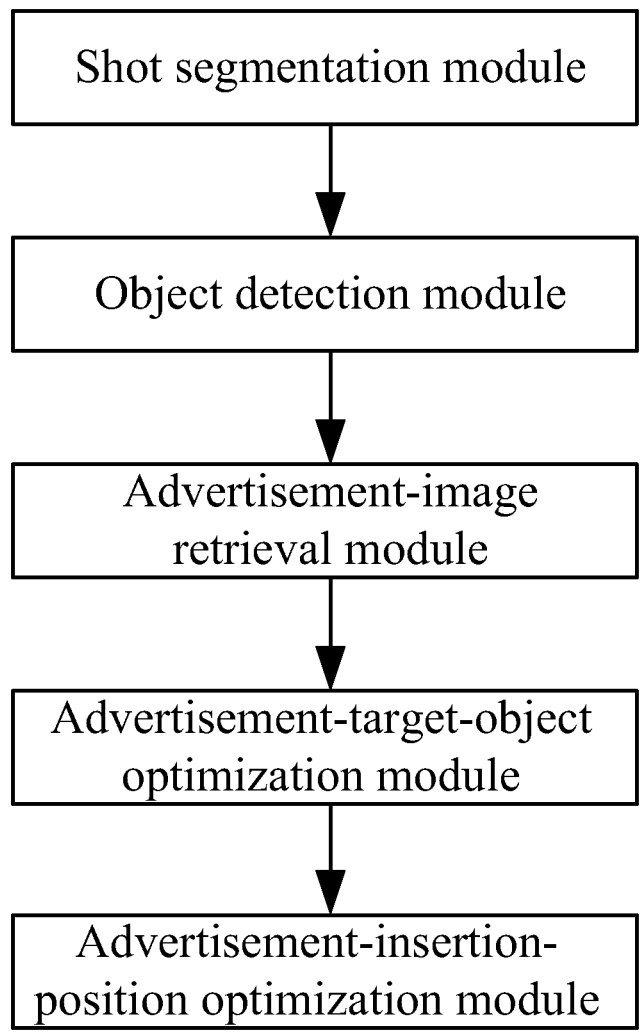
FIG. 2 is a block diagram of a system of advertising based on video content awareness according to an embodiment of the present disclosure.

Step S2: an object detection step, for obtaining relevant information about objects in the video for each individual scene, using region-wise convolutional characteristics based detection; by using region-based convolutional approach for object detection, locations and categories of the objects in the video can be obtained; for an input image, this approach firstly extracts candidate regions; 2000 candidate regions are extracted for each image, and each candidate region undergoes image-size normalization, so that images are normalized to the same size, and then a CNN (convolutional neural network) approach is used to extract characteristic values of the normalized regions. Finally, the extracted characteristic values are input into a linear support vector machine and classified; for each scene, the region-wise convolutional characteristics based object-detection approach is used. By using this approach, some information of the detected object can be obtained, including the category of the object, the probability of pertaining to that category, the appearing time of the object, and the appearing position on the screen. The specific implementation process is as follows. A region-wise convolutional characteristics based object-detection system is shown in FIG. 2. For an input image, firstly, candidate regions are extracted, and 2000 candidate regions are extracted from each image. For each candidate region, the image is normalized to the same size. Then a CNN is utilized to extract characteristic values of the normalized regions. Finally, the extracted characteristics values are input to a linear support vector machine and classified. In this way, it obtains the probability that these regions belong to a particular object. When the probability is greater than a threshold, the region can be extracted as the object. The information obtained through object detection is very important for subsequent advertisement placement. For example, the proposed advertisement target object optimization model depends on the category of the object, detection accuracy and the position information of the object, in order to simultaneously take into account appeal and disturbance of advertisement. As previously mentioned, the present disclosure detects only five types of objects: human, cars, bottles, dogs and bikes. Specifically, the object detection step is as follows: (1) generating candidate regions using the second CPU and transmitting the candidate regions from the second CPU to the memory unit: many latest papers have provided approaches for generating category-independent candidate regions. These approaches include: selective search, and constrained parametric min-cuts (CPMC). The region-wise convolutional characteristics based object detection employs selective search. (2) extracting CNN characteristics: Caffe is employed for implementation of the CNN proposed by Krizhevsky et al., so that, a 4096-dimensional characteristic vector is extracted for each region using the first GPU, and the characteristic vector is output in the penultimate layer of the CNN to the second CPU and is classified in the second CPU and then stored in the memory unit. According to practical experience, CNN achieves quite good results in classification tasks, and will achieve the same effect in detection tasks. According to experiments, the deeper the layers of CNN, the better the effects. (3) classifying objects: considering using a binary classifier to detect a car, apparently, the image region tightly surrounding a car should be positive. Similarly, it is apparent that the background region without cars should be negative. However, for those regions that are partly covered, it is an uncertain problem if they are considered to be positive. By calculating the proportion of the overlapping portions, if the proportion exceeds a threshold, it is considered to be positive. In experiments, the overlapping threshold is 0.3, which is obtained by experimenting with different thresholds and selecting the threshold which has the best result.

Step S3: an advertisement-image retrieval step, for searching, in a database, for advertisement objects matching the objects, using garment retrieval and a category-based strategy; the advertisement-image retrieval comprises two strategies: garment retrieval and category-based retrieval, and in garment retrieval, human body alignment and human body segmentation are used to filter background and extract characteristics, and then a gender-recognition approach is used to identify an actor's gender. If the object selected by the optimization model is human, then it further undergoes characteristics-processing for garment retrieval. In garment retrieval, the present disclosure employs gender recognition and human body alignment, and then extracts characteristics for matching. In contrast, if the object selected belong to another type other than human, the present disclosure employs simple category-based retrieval, which works to randomly search for advertisements belonging to the same category as the object.

The specific implementation process is as follows:

In order to find the relevant garment advertisements, the present disclosure performs further processing of human body to extract characteristics, and then retrieves relevant advertisements by characteristic matching. The system consists of two main components: human body characteristics extraction, which employs human body alignment and human body segmentation; gender recognition, which is used to recognize human genders, in order to retrieve advertisements in databases for different genders. In practice, direct extraction of the characteristics of an entire image for matching often obtains non-ideal results, because the result may appear that the characteristics of a coat are matched with the characteristics of pants. For garment retrieval, human body alignment or human body detection have been proved to be effective for partial matching. But extracted human body may still contain certain characteristics of background. In particular, the background of the advertisement image is usually different from the background of the video. These backgrounds are considered as noise, and may affect the effect of subsequent garment matching. Therefore, it is necessary to filter out the background by a human-body-segmentation approach. On the other hand, if only human body characteristics are used to retrieve the most relevant advertisement in advertisement database, the result may appear that a male actor is matched with woman garment. To avoid this, the present disclosure employs gender recognition to distinguish human into male gender or female gender. Therefore, if the human gender is male/female, characteristics matching will be conducted in a male/female's database. The reason behind this simple strategy is that, it can take advantage of some prior knowledge to increase appeal of the advertisement. For example, if the selected object is a dog, then embedding advertisements on pet supplies into the video is more likely to attract attention of the viewer. Specific steps are as follows:

(1) CNN-based gender recognition. CNN is used for human-portrait training and gender recognition using the third CPU.

(2) extraction of human body characteristics using the third CPU. Extraction of human body characteristics consists of two steps: human body alignment, which is used to match the characteristics of a coat with the characteristics of a coat, instead of with the characteristics of pants; and human body segmentation, which is used to filter the noise caused by background difference; Finally, some characteristics are extracted for retrieval. After the above two steps, the characteristics of various parts of human body can be extracted for matching, meanwhile the background characteristics are also filtered out. In the present disclosure, three types of characteristics are extracted, including HOG, LBP and color histogram. For an advertisement image, its characteristics are extracted in a similar way. By calculating the distance between the characteristic vector of a human body and the characteristic vector of an advertisement image, a similar garment can be retrieved.

(3) characteristic matching using the second GPU and sending the matching result via the third CPU to the memory unit. The extracted three types of characteristics, i.e., HOG, LBP and color histogram, are cascaded into a vector. Assume that the characteristic vector of an advertisement image is expressed as H=[$h_1$, $h_2$, . . . , $h_M$], and the characteristic vector of human in the video is expressed as H'=[$h'_1$, $h'_2$, . . . , $h'_M$]. According to the literature, here, Jensen-Shannon divergence (JSD) is employed to calculate the distance between the two characteristic vectors:

$$d_{JSD}(H, H') = \sum_{m=1}^{M} h_m \log \frac{2h_m}{h_m + h'_m} + h'_m \log \frac{2h'_m}{h_m + h'_m}$$

By calculating the distance, the most relevant garment advertisement image to the objective human body can be retrieved in the database.

Step S4: an advertisement-target-object optimization step, for performing optimization processing of the retrieved advertisement objects matching the objects, to obtain a candidate advertisement; considering appeal and disturbance of advertisements to viewers, the present disclosure takes into account time dispersion, category diversity, as well as local appeal and disturbance, during the optimization process, and employs an optimization approach to select objects for advertisements insertion; After obtaining objects for advertisements insertion through an optimization model, and obtaining a candidate advertisement through retrieval, the candidate advertisement is about to be inserted into the video stream, and it requires to detect the location of the advertisement in the screen.

The specific implementation process is as follows:

To determine which scene is selected to be embedded with an advertisement, and which object in the scene is selected as target object to be inserted with the advertisement, the OLVA system of the present disclosure takes into account many factors and establishes an optimization model. Firstly, advertisements in a video stream are best to be dispersed in time distribution as much as possible, because forcing users to watch many advertisements in a short period of time may lead to annoyance of users. Secondly, different objects are detected in the video, and according to different types of the objects, different types of advertisements can be inserted. From advertising publishers' point of view, they certainly wish to insert as many types of advertisements as possible. Because the variety of advertisement types more likely causes users' attention. Since the types of advertisements are directly related to the types of target objects, it should choose as many types of objects as possible. Thirdly, the number of times that an object appears in a scene is different. Some objects may appear frequently, and some objects appear only once. The present disclosure is intended to insert advertisements for objects that frequently appear rather than objects that rarely appear. On the one hand, frequently appearing objects are usually more important. On the other hand, according to advertising strategy, when advertisements are inserted for frequently appearing objects, the advertisements stay longer on the screen. Therefore, if a frequently appearing object is chosen for advertisement insertion, it is more likely to attract the attention of the viewers, compared with objects that appear less number of times. Fourthly, in terms of the location of an object that appears on a screen, important objects or focused objects are located near the center of the screen. Thus, if multiple objects are detected in the same frame, the present disclosure desires to select an object closer to the center of the screen as the target object. By doing so, the inserted advertisements may be more appealing to the audience. Fifthly, the confidence level of each detected object must be taken into account, because it is essential to ensure the relevance of the object and the advertisement. If the detection is in error, the inserted advertisement will not be relevant. Therefore, it needs to choose detected objects of higher confidence level for advertisement insertion. Finally, it is best to insert an advertisement in a clean scene, that is, a scene that contains only one or very few objects. If more objects appear within a scene, then plot and contents of the scene may be relatively complicated. If an advertisement is inserted in such a scene, the resulting video will be more complicated. Consequently, it will cause significant disturbance to users. By taking into account the above six factors that may have a tremendous impact on system performance OLVA, the present disclosure converts it to a mathematical optimization problem, and employs an optimization approach to solve the problem, to achieve the aim of enhancing appeal and reducing disturbance of advertisements. In the following, the present disclosure provides a detailed definition of the optimization problem and a specific approach for solving the problem.

A video including $N^s$ scenes can be expressed as $S=\{s_i\}_{i=1}^{N^s}$. For each scene i, it comprises $N_i^o$ objects, which can be expressed as $$O_i = \{o_{ij}\}_{j=1}^{N_i^o},$$

and all objects included in a video can be expressed as $O=\{O_i\}_{i=1}^{N^s}$. The optimization aim of the present disclosure is to select appropriate scenes and appropriate objects for advertisement insertion.

Define the following variables $x \in R^{N^s}$, $$y \in R^{\sum_{i=1}^{N^s} N_i^o},$$

$y_i \in R^{N_i^o}$, $x=[x_1, \ldots, x_i, \ldots x_{N_s}]$, $x_i \in \{0,1\}$, and $y=[y_1, \ldots, y_{N^s}]$, where, $x_i$ and $y_{i,j}$ represent the scene i and whether the object j in the scene i is selected. The present disclosure only allows one object to be selected in the same scene. Objects will be selected in different N scenes. Each object is associated with an advertisement. The present disclosure defines the selected scene as $S^*=\{s^*_i\}_{i=1}^N$, and the selected object as $O^*=\{o^*_i\}_{i=1}^N$.

According to the previous discussion, establishing an optimization model needs to consider many factors. The present disclosure classifies the to-be-considered factors into three classes:

Time Dispersion: the time distribution of advertisements in a video stream. The inserted advertisements are best to be dispersed in the video stream, rather than aggregated in a period of time. For this problem, the best result is: for any two adjacent advertisements, the time interval is the same. In other words, the time distribution of advertisements is uniform, that is, the time interval for advertisements is $$\frac{T^v}{N},$$

where $T^v$ represents the duration of the video. In the optimization process, the minimum time interval between any two adjacent selected scenes may be used as a variable to reflect time dispersion. Obviously, when it reaches the minimum value, the time distribution of advertisements is uniform. The present disclosure defines the sequence in which scenes appear as time, and the minimum time interval is defined as follows.

$$D^t = \underset{i,k}{\mathrm{argmin}}(g(|k-i|\cdot x_i \cdot x_k)),$$

$$g(a) = \begin{cases} \rho, & a=0 \\ a, & a \neq 0 \end{cases},$$

where, $\rho$ is a very large number. Thus, for each pair of selected scenes, the time difference between the two scenes is calculated, and then the minimum time difference is selected to reflect the degree of time dispersion.

Category diversity: It represents the diversity of the categories of selected objects. Because the relevant advertisements are searched by category, the category of the object indicates the category of the relevant advertisements. The more diversity the categories of the inserted advertisements, the greater the probability that the viewer is attracted by the advertisements. In order to make advertisement types more diversified, the present disclosure selects different types of objects as target objects. In this way, the diversity of categories is defined as:

$$D^c = \frac{1}{N(N-1)} \sum_{i,j,k,l} f((C^o_{ij}-C^o_{kl})\cdot x_i \cdot y_{ij} \cdot x_k \cdot y_{kl}),$$

$$f(a) = \begin{cases} 0, & a=0 \\ 1, & a \neq 0 \end{cases},$$

where, $C^o_{ij}$ represents the category of object $o_{ij}$. In the implementation, the category of an object is represented by an integer.

Local appeal and disturbance: These factors are related only to local objects and scenes. It contains four factors: 1) the confidence level of the detected object; 2) the appearing frequency of the object; 3) the distance between the object and the center of the screen; 4) possible disturbance of advertisement insertion. Firstly, define the confidence level of the object j in the scene i as $A^d_{ij}$. Secondly, two strategies are employed for calculating the appearing frequency of the objects in the scene. For human, face clustering is employed to classify the same person's images as one class. The appearing frequency of the person is obtained by calculating the number of times that the person appears in the scene. For other types of objects, the appearing frequency of the object is obtained by calculating the number of times that objects of the same category appear in the scene. Assume that the number of all objects that appear in the scene i is $N_i^f$, and the number of times that object j appears in the scene i is $N_{ij}^f$, thus, the appearing frequency of this object is defined as $$F_{ij} = \frac{N_{ij}^f}{N_i^f}.$$

Thirdly, through object detection, the location information of the object is obtained. Define $D_{ij}^s$ as the distance between the object j in the scene i and the center of the video screen. Finally, define the disturbance of advertisement insertion for the object j in the scene i is $I_{ij}$, which is the number of objects in the time range of the advertisement insertion. The time range of the advertisement insertion is just the time range that the objects appear. Based on the above definitions, Local appeal and disturbance are defined in the form as below.

$$L = \frac{1}{N} \sum_{i,j} ((\xi_1 A^d_{ij} + \xi_2 F_{ij} + \xi_3/(D^s_{ij}+1) + \xi_4/I_{ij}) \cdot x_i \cdot y_{ij})$$

where, $\xi_1+\xi_2+\xi_3+\xi_4=1$, and $\xi_1$, $\xi_2$, $\xi_3$, $\xi_4$ represent the importance of each factor. In the present disclosure, set $\xi_1=0.5$, $\xi_2=0.1$, $\xi_3=0.1$, $\xi_4=0.3$. In addition, $D_{ij}^d$, $F_{ij}$, $1/(D_{ij}^s+1)$ and $1/I_{ij}$ are all normalized to the range (0,1].

Consider the above factors, define the following optimization model:

$$\max h(x,y) = w_1 \cdot D^t + w_2 \cdot D^c + w_3 \cdot L$$

$$= w_1 \cdot \underset{i,k}{\mathrm{argmin}}(g(|i-k|\cdot x_i \cdot x_k)) +$$

$$w_2 \cdot \frac{1}{N(N-1)} \sum_{i,j,k,l} f((C^o_{ij}-C^o_{kl})\cdot x_i \cdot y_{ij} \cdot x_k \cdot y_{kl}) +$$

$$w_3 \cdot \frac{1}{N} \sum_{i,j} (\xi_1 A^d_{ij} + \xi_2 F_{ij} + \xi_3/(D^s_{ij}+1) + \xi_4/I_{ij}) \cdot x_i \cdot y_{ij},$$

Meet the constraints $\Sigma x_i = N$, $\Sigma x_i \cdot y_{ij} = N$, $x_i \in \{0,1\}$, $y_{ij} \in \{0,1\}$, where, $w_1$, $w_2$, $w_3$ are three predefined weighting parameters. Set $w_1=w_2=w_3=1$, this indicates that the factors $D^t$, $D^c$, and L are same in importance.

Assume that each scene contains same objects $N_o$, then the optimization problem will have $C_N^N N_o^N$ different solutions. When the number of scenes and objects is relatively large, the search space will be significantly increased. According to experimental experience, for a video comprising 100 scenes, with each scene containing 10 objects, it would take one day to search for the optimal solution by using an exhaustive search approach. To improve efficiency, the present disclosure designs a heuristic algorithm (HA) to search for the optimal solution. The basic idea of the algorithm is that: in each step, searching for the best object and scene, until N object is found. Although the heuristic algorithm is easy to fall into a local minimum, it can fast find a relatively good solution. By using the heuristic algorithms, it needs only $NN_o(N^s-(N-1/2))$ steps to obtain the solution.

For comparison, the present disclosure employs a genetic algorithm (GA) to solve the problem from a global perspective. Before implementation of the genetic algorithm, the optimization problem is encoded as a vector $$z \in R^{N^s + \sum_{i=1}^{N^s} N_i^o},$$

which is called chromosome, and its form is as follows:

$$Z = [x, y] = [x_1, y_1 \ldots y_{N^s}] = \left[ \underbrace{x_1, \ldots X_{N^s}}_{scenes}, \underbrace{\underbrace{y_{11}, \ldots, y_{1N_1^o}}_{objects\ in\ scene\ 1}, \ldots \underbrace{y_{N^s 1}, \ldots, y_{N^s N_{N^s}^o}}_{objects\ in\ scene\ N^s}}_{objects} \right]$$

The genetic algorithm operates a collection of these binary chromosomes, and a collection is called a group, the group is randomly initialized, but to meet the condition of $\Sigma x_i = N$, $\Sigma x_i \cdot y_{ij} = N$, $x_i \in \{0,1\}$, $y_{ij} \in \{0,1\}$. The genetic algorithm uses two operations to generate new individuals, the two operations are: crossover: its principle is to combine two chromosomes (called ancestors) together to form a new chromosome (called descendant); mutation: its purpose is to introduce randomly changed genes into the chromosome. It should be noted that, the genetic algorithm of the present disclosure is slightly different from a traditional genetic algorithm, because the crossover and mutation need to meet the constraints $\Sigma x_i = N$, $\Sigma x_i \cdot y_{ij} = N$, $x_i, y_{ij} \in \{0,1\}$. At the time of initialization, N scenes are randomly selected, and the corresponding $x_i$ is set to 1, in order to meet the constraint $\Sigma x_i = N$. At the same time, in each selected scene, one object is selected respectively, and the corresponding $y_{ij}$ is set to 1, in order to meet the constraint $\Sigma x_i \cdot y_{ij} = N$. In the crossover operation, x, $y_1$, $y_2$, . . . , $y_{N^s}$ are regarded as basic components, so that the crossover operation is the same as that of the traditional genetic algorithm. In the mutation operation, respectively, the components x and $y_u$ (u=1, 2, . . . , $N^s$) are processed separately. Specifically, the locations of 0 and 1 in these components will be randomly switched. In the present disclosure, the settings are: the population size of the group is 200, the crossover rate is 0.25, the mutation rate is 0.01, and the number of iterations is 200.

Step S5: an advertisement-insertion-position optimization step, for optimizing the distance between an advertisement and a target object, as well as the area of the overlapping regions between the advertisement and all the objects. The advertisement-insertion-point selection, by optimizing the distance between an advertisement and a target object, as well as the area of the overlapping regions between the advertisement and all the objects in the scene, is set to be closest to the target object, but not overlapping with other objects. A model is utilized to optimize the distance between an advertisement and a target object, as well as the area of the overlapping regions between the advertisement and all the objects. The present disclosure regards that: the smaller the distance and the overlapping area, the better. A gradient descent approach is used to solve this optimization problem. After the above steps, a video with a content-relevant advertisement will appear in front of the user.

The specific implementation process is as follows.

The above optimization approaches allow to determine which objects in which scenes are to be inserted with advertisements. In addition, by retrieving, for each object, a corresponding relevant advertisement has already found. The subsequent work is how to find a display position on the screen for the advertisement. In fact, there are many strategies and approaches to display advertisements. Specifically, advertisements can be displayed: 1) at the beginning or end of the video; 2) At the end of each scene; 3) at an unimportant location in the scene; 4) near the target object in the screen. The first strategy has been widely used in the current online-video websites such as YouTube and Yahoo Video. However, these websites usually do not consider the relevance between displayed advertisements and video contents. In addition, as previously mentioned, text information is only a rough description of a video. Its resulting correlation is not sufficient to compensate for the semantic gap between video contents and advertisements. In contrast, object-level correlations allow the system of the present disclosure to maximize the value of video advertisements. The third strategy is a simple choice, which is similar to pop-up Flash advertisements on many websites. The unimportant location may be the corners of a screen. But from viewers' point of view, they may not notice those corners because they are more likely to focus on the central area of the screen where a video is played. From the perspective of advertisement publishers, the more viewers attracted to the inserted advertisements, the more valuable the advertisement system is. The purpose of the last strategy is: targeting an object, and inserting, around the object, an advertisement relevant to the object, to attract the attention of the audience. However, if the frame where the target object appears contains a number of other objects, the advertisements displayed may cover other objects, causing disturbance to the audience. In the present disclosure, an insertion-position-detection optimization model is defined, and the last strategy is employed for advertisement insertion.

In the optimal-insertion-position detection process, the following two factors are to be considered.

Distance: the distance between the inserted advertisement and a target object. Define $(x_a, y_a)$ as the center of the advertisement, $h_a$ as half of its height, and $w_a$ as half of its width. Similarly, define $(x_{t,o}, y_{t,o})$ as the center of the target object, $h_{t,o}$ as half of its height, $w_{t,o}$ as half of its width. As shown in the figure, the distance between the advertisement and the object can be represented by the following formula:

$$D_{ato} = \begin{cases} \sqrt{(x_a - x_{t,o})^2 + (y_a - y_{t,o})^2}\left(1 - \dfrac{w_a + w_{t,o}}{|x_a - x_{t,o}|}\right) & |x_a - x_{t,o}| > w_a + w_{t,o}, \\ \sqrt{(x_a - x_{t,o})^2 + (y_a - y_{t,o})^2}\left(1 - \dfrac{h_a + h_{t,o}}{|y_a - y_{t,o}|}\right) & |x_a - x_{t,o}| < w_a + w_{t,o}, \\ & |y_a - y_{t,o}| > h_a + h_{t,o}, \\ 0 & \text{otherwise} \end{cases}$$

Overlap: the area that the advertisement superposes on all the objects in the video frames. The overlapping regions between the advertisement and the objects may be defined as $$Q_i = W_i \cdot H_i$$

where, the width is $$W_i = \begin{cases} (w_a + x_a) - (x_{i,o} - w_{i,o}) & w_{i,o} + w_a > x_a - x_{i,o}, x_a > x_{i,o}, \\ (w_{i,o} + x_{i,o}) - (x_a - w_a) & w_{i,o} + w_a > x_{i,o} - x_a, x_a < x_{i,o}, \\ 0 & w_{i,o} + w_a \leq |x_{i,o} - x_a| \end{cases}$$

the height is $$H_i = \begin{cases} (h_{i,o} + y_{i,o}) - (h_a - y_a) & h_{i,o} + h_a > y_a - y_{i,o}, y_{i,o} < y_a, \\ (h_a + y_a) - (h_{i,o} - y_{i,o}) & h_{i,o} + h_a > y_{i,o} - y_a, y_{i,o} > y_a, \\ 0 & h_{i,o} + h_a \leq |y_{i,o} - y_a| \end{cases}$$

Synthesizing consideration of the above two factors, the optimal-advertisement-insertion-position detection problem can be transformed into an optimization model:

$$\min_{(x_a, y_a)} f(x_a, y_a) = \sum_{i=1}^{N_o} Q_i + D_{ato}$$

where, $N_o$ represents the number of objects detected in the frame, $Q_i$ represents the area of the overlapping regions between the advertisement and the object i.

To solve the above problem, the present disclosure designs a gradient descent approach to search optimal solutions $x_a$ and $y_a$ corresponding to the function $f(x_a, y_a)$. The gradient can be generated as follows:

$$\nabla x_a = \frac{\partial f(x_a, y_a)}{\partial x_a} = \sum_{i=1}^{N_o} \frac{\partial Q_i}{\partial x_a} + \frac{\partial D_{ato}}{\partial x_a} = \sum_{i=1}^{N_o} \left(\frac{\partial W_i}{\partial x_a} H_i\right) + \frac{\partial D_{ato}}{\partial x_a}$$

$$\nabla y_a = \frac{\partial f(x_a, y_a)}{\partial y_a} = \sum_{i=1}^{N_o} \frac{\partial Q_i}{\partial y_a} + \frac{\partial D_{ato}}{\partial y_a} = \sum_{i=1}^{N_o} \left(\frac{\partial H_i}{\partial x_a} W_i\right) + \frac{\partial D_{ato}}{\partial y_a}.$$

where, $$\frac{\partial W_i}{\partial x_a} = \begin{cases} x_a & w_{i,o} + w_a > x_a - x_{i,o}, x_a > x_{i,o} \\ x_a & w_{i,o} + w_a > x_{i,o} - x_a, x_a < x_{i,o} \\ 0 & w_{i,o} + w_a \leq |x_{i,o} - x_a| \end{cases}$$

$$\frac{\partial D_{ato}}{\partial x_a} = \begin{cases} \frac{x_a - x_{t,o}}{\sqrt{(x_a - x_{t,o})^2 + (y_a - y_{t,o})^2}}\left(1 - \frac{w_a + w_{t,o}}{x_a - x_{t,o}}\right) + \sqrt{(x_a - x_{t,o})^2 + (y_a - y_{t,o})^2} \cdot \frac{w_a + w_{t,o}}{x_{t,o} - x_a} \\ \quad x_a - x_{t,o} > w_a + w_{t,o}, x_a > x_{t,o} \\ \frac{x_a - x_{t,o}}{\sqrt{(x_a - x_{t,o})^2 + (y_a - y_{t,o})^2}}\left(1 - \frac{w_a + w_{t,o}}{x_{t,o} - x_a}\right) + \sqrt{(x_a - x_{t,o})^2 + (y_a - y_{t,o})^2} \cdot \frac{w_a + w_{t,o}}{x_a - x_{t,o}} \\ \quad x_{t,o} - x_a > w_a + w_{t,o}, x_a > x_{t,o} \\ \frac{x_a - x_{t,o}}{\sqrt{(x_a - x_{t,o})^2 + (y_a - y_{t,o})^2}}\left(1 - \frac{h_a + h_{t,o}}{|y_a - y_{t,o}|}\right) x_a - x_{t,o} < w_a - w_{t,o}, |y_a - y_{t,o}| > h_a + h_{t,o} \\ 0 \quad \text{otherwise} \end{cases}$$

The insertion position of the advertisement can be updated as follows:

$$(x_a(t+1), y_a(t+1)) = (x_a(t), y_a(t)) + \mu \cdot (-\nabla x_a, -\nabla y_a)$$

where, µ is the learning rate for each iteration. Then, iteration is repeated to update the position for advertisement insertion, until the position change $\|(x_a(t), y_a(t)) - (x_a(t-1), y_a(t-1))\|_2$ reaches a predetermined threshold or the number of iterations reaches the maximum number. As can be seen, in most cases, the gradient descent approach can find one optimal position, although there are a number of optimal positions, and the number of iterations required is not large, as the optimal position can be found by about 10 iterations.

An example of using the method to advertise clothes in a video is described as follows:

Shot Segmentation: A video typically consists of many shots. Each shot is a set of time-continuous frames, among which the background is the same. Many objects may appear in a single shot. In order to create low intrusiveness for users, at most one advertisement that is related to the selected object can be inserted into a shot. Before object detection and selection, a source video needs to be divided into shots.

Object Detection: human bodies in one frame from the source video are detected.

Clothes Retrieval: For a human object, viewers of the video may be interested in what he or she is wearing. Hence, if a related clothes advertisement is inserted here, it is more likely to attract the viewers to click on the advertisement than if it was inserted elsewhere. To identify a related clothes advertisement, the features are extracted from the human body and retrieval method for advertising is used, including human parts feature extraction, which is utilized to separate the human parts features from the image background, and gender recognition, which is used to recognize human gender so as to search advertisements in different databases.

Optimization: After determining which shot to insert with advertisement and which object will be the target object in the shot for advertising, optimization is conducted in consideration of several factors that may affect the effectiveness of the method. First, from the aspect of advertisement distribution over a video stream, it is expected to insert advertisement scattered in the video stream, because forcing users to view many advertisements repeatedly during a short period of time may cause them to feel quite frustrated. Second, many objects can be detected in a video shot. For different types of objects, different types of advertisements can be inserted corresponding to the objects. From the perspective of advertisers, it is desirable to insert as many different types of advertisements possible, because the more diverse the types of advertisements are, the more probable the viewers are to be attracted by the advertisements. In other words, it is better to select different categories of objects as the target objects for advertising. Third, object occurrence frequency is usually different. Some objects may frequently appear, while others appear only once. It is meaningful to insert advertisements associated with the frequently occurring objects, instead of the rarely occurring ones. On the one hand, frequently occurring objects are usually more important than rarely occurring objects. On the other hand, the time that the inserted advertisements corresponding to the frequently occurred objects remain on the screen is longer. Thus, it is more likely to attract the viewers' attention if the frequently occurring objects are chosen as target objects for advertising, in contrast to choosing the rarely occurring objects. Fourth, from the positional aspect that an object appears on the screen, the important objects or focused objects in a shot are usually located around the center of the screen. Therefore, if a few objects are detected in a shot, it is desirable to select the objects which frequently appear around the center of the screen as the target objects. As a result, the inserted advertisements should be more likely to attract the attention of viewers. Fifth, it is critical for assuring the relevance between the object and the ad. Finally, it is desirable to insert advertisements in a clean shot, i.e., a shot that contains only one, or very few, objects. Many objects appearing in a single shot may make the content-plot of a video clip complicated. If advertisements are inserted into such a shot, the resulting video clips will appear even more complicated. Consequently, the intrusiveness for viewers will become high. By considering these factors, the method conducts the optimization processing of the advertisement objects matching the objects in the source video to obtain a candidate advertisement, adding the candidate advertisement into the source video, and optimizing a distance between the candidate advertisement and the target object in the source video and an area of overlapping regions between the candidate advertisement and the objects in the source video.

Distribution and displaying: After optimization, distributing the video that comprises the candidate advertisement to a plurality of displays and displaying the video that comprises the candidate advertisement on the plurality of displays.

The present disclosure provides the video content awareness based advertising method and system, and in particular, provides the internet-video content awareness based advertising method and system. The main innovative work of the present disclosure lies in the following two aspects: 1) OLVA advertisement system; 2) optimization model for video advertisement placement. The effectiveness of the first aspect depends on object detection technology. The principle of the optimization model is simultaneously taking into account increasing appeal of advertisements and reducing disturbance of advertisements to users.

FIG. 2 shows the video content awareness based advertising system, and the advertising system comprises:
a shot segmentation module, for segmenting a source video into individual scenes, using a clustering-based approach;
an object detection module, for obtaining relevant information about objects in the video for each individual scene, using region-wise convolutional characteristics based detection;
an advertisement-image retrieval module, for searching, in a database, for advertisement objects matching the objects, using garment retrieval and a category-based strategy;
an advertisement-target-object optimization module, for performing optimization processing of the retrieved advertisement objects matching the objects, to obtain a candidate advertisement;
an advertisement-insertion-position optimization module, for optimizing the distance between an advertisement and a target object, as well as the area of the overlapping regions between the advertisement and all the objects.

The shot segmentation module comprises:
a category-number statistic unit, for calculating the number N of categories for clustering, according to a duration of a video;
a center-initialization unit, for randomly selecting N frames as initial centers, according to the duration;
a distance-calculation unit, for calculating a distance from each frame to its time-proximal center and updating the center, respectively;
an iterative calculation unit, for repeating A3 until convergence or reaching a maximum running number.

The object detection module comprises:
a region-generation unit, for employing selective search, to generate category-independent candidate regions in an individual scene;
an extraction unit, for utilizing a CNN, to extract a 4096-dimensional characteristic vector for each candidate region and output it in a penultimate layer;
a classification unit, for classifying the objects of the extracted 4096-dimensional characteristic vector.

The advertisement-image retrieval module comprises:
a gender-recognition unit, for recognizing human genders in the video, on the basis of the CNN;
a characteristics-extraction unit, for extracting human body characteristics in the video;
a characteristics-matching unit, for matching the extracted human body characteristics.

The advertisement insertion in the video employs seamless insertion.

During shot segmentation, by extracting characteristic values of each image, and then performing unsupervised learning, segmented scenes are thus obtained. Scene-clustering is different from other clustering approaches, because it is required to takes into account the time at which a frame appears, and only frames that appear at proximal time can be clustered together.

During object detection, a region-wise convolutional characteristics based object-detection system is used. For a picture of the first input extraction candidate region, each image extraction 2000 candidate region. For each candidate region, the image is normalized to the same size. Then a CNN is utilized to extract characteristic values of the normalized regions. Finally, the extracted characteristics values are input to a linear support vector machine and classified. In this way, it obtains the probability that these regions belong to a particular object. When the probability is greater than a threshold, the region can be extracted as the object.

During advertisement-image retrieval, in order to find the relevant garment advertisements, the present disclosure performs further processing of human body to extract characteristics, and then retrieves relevant advertisements by characteristic matching. The system comprises two main components: human body characteristics extraction, which employs human body alignment and human body segmentation; gender recognition, which is used to recognize human genders, in order to retrieve advertisements in databases for different genders. For garment retrieval, human body alignment or human body detection have been proved to be effective for partial matching. But extracted human body may still contain certain characteristics of background. In particular, the background of the advertisement image is usually different from the background of the video. These backgrounds are considered as noise, and may affect the effect of subsequent garment matching. Therefore, it is necessary to filter out the background by a human-body-segmentation approach. On the other hand, if only human body characteristics are used to retrieve the most relevant advertisement in advertisement database, the result may appear that a male actor is matched with woman garment. To avoid this, the present disclosure employs gender recognition to distinguish human into male gender or female gender. Therefore, if the human gender is male/female, characteristics matching will be conducted in a male/female's database.

Advertisement-target-object optimization: through the above steps, relevant advertisement corresponding to each object can be obtained, however, there are many objects in a video, it is not possible to insert an advertisement for each object, otherwise a video will be filled with advertisements, therefore, it is necessary to selectively insert advertisements. When selecting an object, it is necessary to take into account appeal of advertisements and disturbance of advertisement insertion to users. To select appropriate scenes and target objects, the present disclosure designs a model for optimization of the selection results.

Advertisement-insertion-position optimization: after a target object to be inserted with an advertisement is obtained, a retrieval result corresponding to the object can be obtained, that is, a to-be-inserted advertisement is obtained. The advertisement is to be inserted within the time range in which the target object appears, but the advertisement-insertion position on a screen is not determined yet. In order to increase appeal of the advertisement to users, the present disclosure proposes that, the closer the advertisement to the target object, the better. In order to reduce disturbance of advertisement insertion to users, the advertisements should not cover other objects. Based on the above two factors, the present disclosure employs the gradient descent approach to determine the insertion position for finally inserting the advertisements into the video.

Unless otherwise indicated, the numerical ranges involved in the invention include the end values. While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

The invention claimed is:
1. A method of advertising, the method comprising:
1) recording a source video using a camera, storing the source video in a memory unit, segmenting the source video into individual scenes using a first CPU by a clustering-based approach, and storing the individual scenes in the memory unit;
2) obtaining relevant information about objects in the source video for each individual scene using a second CPU and a first GPU by region-wise convolutional characteristics based detection, and storing the relevant information about the objects in the source video in the memory unit;
3) searching, in a database, for advertisement objects matching the objects in the source video by garment retrieval and a category-based strategy using a second GPU and a third CPU;
4) performing optimization processing of the advertisement objects matching the objects in the source video to obtain a candidate advertisement using a fourth CPU;
5) adding the candidate advertisement into the source video, optimizing a distance between the candidate advertisement and a target object in the source video and an area of overlapping regions between the candidate advertisement and the objects in the source video using a fifth CPU to obtain a video that comprises the candidate advertisement; and
6) distributing the video that comprises the candidate advertisement to a plurality of displays and displaying the video that comprises the candidate advertisement on the plurality of displays,
wherein the segmenting a source video into individual scenes using the first CPU by the clustering-based approach comprises the following steps:
1.1) calculating a number N of categories for clustering using the first CPU according to a duration of a video, and transmitting the number N from the first CPU to the memory unit;
1.2) randomly selecting N frames as initial centers using the first CPU according to the duration, and transmitting the initial centers from the first CPU to the memory unit;
1.3) calculating a distance from each frame to its time-proximal center, updating the center using the first CPU to obtain an updated center, and transmitting the updated center from the first CPU to the memory unit; and
1.4) repeating 1.3) until convergence or reaching a maximum running number.

2. The method of claim 1, wherein the obtaining the relevant information about the objects in the source video for each individual scene using the second CPU and the first GPU by region-wise convolutional characteristics based detection comprises the following steps:
2.1) employing selective search to generate category-independent candidate regions in an individual scene using the second CPU, and transmitting the candidate regions from the second CPU to the memory unit;
2.2) utilizing a convolutional neural network (CNN) to extract a 4096-dimensional characteristic vector for each candidate region using the first GPU, and outputting the characteristic vector in a penultimate layer to the second CPU; and
2.3) classifying the objects of the 4096-dimensional characteristic vectors using the second CPU.

3. The method of claim 1, wherein the searching, in a database, for advertisement objects matching the objects using garment retrieval and the category-based strategy using the second GPU and the third CPU comprises the following steps:
3.1) recognizing human genders in the video on the basis of a convolutional neural network (CNN) using the second GPU and the third CPU;

3.2) extracting human body characteristics in the video using the third CPU; and 3.3) matching the human body characteristics using the second GPU to obtain a matching result, and sending the matching result via the third CPU to the memory unit.

4. The method of claim 1, wherein adding the candidate advertisement into the source video employs seamless insertion; and the video that comprises the candidate advertisement is stored in the memory unit.

5. A system of advertising, the system comprising:
a camera, adapted for recording a source video;
a memory unit, adapted for storing the source video;
a shot segmentation module comprising a first CPU;
an object detection module comprising a second CPU and a first GPU;
an advertisement-image retrieval module comprising a third CPU and a second GPU;
an advertisement-target-object optimization module comprising a fourth CPU; and
an advertisement-insertion-position optimization module comprising a fifth CPU; wherein:
the system is connected to a plurality of displays;
the first CPU is adapted to calculate and segment the source video into individual scenes based on clustering-based approach, and to store the individual scenes in the memory unit;
the first GPU is adapted to calculate and obtain information about objects in the source video for each individual scene by region-wise convolutional characteristics based detection, and to store the information about the objects in the source video in the memory unit;
the second GPU is adapted to search in a database for advertisement objects that match the objects using garment retrieval and a category-based strategy;
the fourth CPU is adapted to perform optimization processing of the retrieved advertisement objects that match the objects in the source video to obtain a candidate advertisement; and
the fifth CPU is adapted to add the candidate advertisement into the source video, to optimize the distance between the candidate advertisement and a target object and the area of overlapping regions between the candidate advertisement and the objects in the source video to obtain the video that comprises the candidate advertisement, to distribute the video that comprises the candidate advertisement to the plurality of displays, and to display the video that comprises the candidate advertisement on the plurality of displays,
wherein the shot segmentation module comprises:
a category-number statistic unit comprising circuitry, being configured to calculate the number N of categories for clustering using the first CPU according to a duration of a video and to transmit the number N from the first CPU to the memory unit;
a center-initialization unit comprising circuitry, being configured to randomly select N frames as initial centers using the first CPU according to the duration and to transmit position data of the initial centers from the first CPU to the memory unit;
a distance-calculation unit comprising circuitry, being configured to calculate a distance from each frame to its time-proximal center, to update the center using the first CPU to obtain an updated center, and to transmit the updated center from the first CPU to the memory unit; and
an iterative calculation unit comprising circuitry, being configured to control the distance-calculation unit to repeat calculating a distance from each frame to its time-proximal center, updating the center using the first CPU to obtain an updated center, and transmitting the updated center from the first CPU to the memory unit using the first CPU and the memory unit until convergence or reaching a maximum running number.

6. The system of claim 5, wherein the object detection module further comprises:
a region-generation unit comprising circuitry, being configured to employ selective search, to generate category-independent candidate regions in an individual scene using the second CPU, and to transmit the candidate regions from the second CPU to the memory unit;
an extraction unit comprising circuitry, being configured to utilize a CNN to extract a 4096-dimensional characteristic vector for each candidate region, and to output the 4096-dimensional characteristic vector in a penultimate layer from the first GPU to the second CPU; and
a classification unit comprising circuitry, being configured to classify the objects of the extracted 4096-dimensional characteristic vector using the second CPU to obtain a classified vector, and to transmit the classified vector to the memory unit.

7. The system of claim 5, wherein the advertisement-image retrieval module comprises:
a gender-recognition unit comprising circuitry, being configured to recognize human genders in the video on the basis of the CNN using the second GPU and the third CPU, and to transmit the human genders in the video to the memory unit;
a characteristics-extraction unit comprising circuitry, being configured to extract human body characteristics in the video using the third CPU; and
a characteristics-matching unit comprising circuitry, being configured to match the human body characteristics using the second GPU to obtain a matching result, and to transmit the matching result to the memory unit using the third CPU.

8. The system of claim 5, wherein adding the candidate advertisement into the source video employs seamless insertion to obtain an advertisement-inserted video; and the video that comprises the candidate advertisement is stored in the memory unit.

* * * * *